United States Patent [19]

Perkins

[11] 4,029,149

[45] June 14, 1977

[54] PROPPING SUBTERRANEAN FORMATION FRACTURES

[75] Inventor: Larry F. Perkins, Duncan Falls, Ohio

[73] Assignee: Halliburton Company, Duncan, Okla.

[22] Filed: July 11, 1975

[21] Appl. No.: 594,994

[52] U.S. Cl. .................................. 166/280; 166/281
[51] Int. Cl.² ......................................... E21B 43/26
[58] Field of Search .......... 166/253, 271, 274, 280, 166/281, 293, 308

[56] References Cited

UNITED STATES PATENTS

| | | | |
|---|---|---|---|
| 3,044,550 | 7/1962 | Eilers | 166/281 |
| 3,363,691 | 1/1968 | Gomory | 166/280 |
| 3,593,791 | 7/1971 | Parker | 166/291 |
| 3,654,990 | 4/1972 | Harnsberger et al. | 166/281 |
| 3,654,991 | 4/1972 | Harnsberger et al. | 166/281 |
| 3,654,992 | 4/1972 | Harnsberger et al. | 166/281 |
| 3,850,247 | 11/1974 | Tinsley | 166/280 |

*Primary Examiner*—Ernest R. Purser
*Attorney, Agent, or Firm*—Thomas R. Weaver; C. Clark Dougherty, Jr.; John H. Tregoning

[57] ABSTRACT

A method of propping fractures in a subterranean formation whereby a high viscosity fluid is introduced into the formation to open and extend the fractures, the high viscosity fluid containing slugs of a hardenable liquid which are carried into and held in spaced relationship in the fractures and permitted to harden therein whereby the fractures are propped in the open position.

9 Claims, No Drawings

PROPPING SUBTERRANEAN FORMATION FRACTURES

Many methods of fracturing subterranean formations and propping open the fractures have been developed and used heretofore. The creation and propping of fractures in a subterranean fluid producing formation penetrated by a well bore stimulates the production of the fluids by providing flow channels in the formation through which produced fluids can readily flow to the well bore.

Heretofore, a variety of propping agents have been utilized for maintaining created fractures in the open position. Generally, these propping agents are in the form of beads or granules of selected size, with the most commonly utilized propping agent being sand of selected grade. In placing a granular or particulated propping agent in a fracture after the fracture has been formed, the propping agent is generally introduced into the fracture as a suspension in a liquid. The propping agent often settles in the fracture, resulting in a thin continuous layer of propping agent being formed at the bottom of the fracture. When the pressure exerted on the formation is reduced, the fracture closes on the thin layer of propping agent leaving a thin or narrow low capacity channel through which the fluids produced from the formation must travel. This problem of the propping agent settling to the bottom of the fractures created in a formation is particularly severe where the fractures are substantially vertically orientated and extend below the producing formation. In this situation, the propping agent settles to the bottom portions of the fractures below the producing formation allowing the upper portions of the fractures in the producing formation to close resulting in very little increase in production from the producing formation as a result of the fracture treatment. Even in situations where the propping agent is placed within the portions of the fractures located in the producing formation, when granular propping agents such as sand are utilized, the flow channels containing the granular material often quickly plug off with paraffin, salt, magnetite or other solid material resulting in little or no increase in the production of desired fluids from the formation.

By the present invention, improved methods of fracture stimulating subterranean formations and of propping fractures formed in subterranean formations are provided whereby the fractures are propped over an extended portion of their height in a manner whereby plugging of the resulting flow channels does not take place.

The method of propping fractures formed in a subterranean formation of the present invention basically comprises introducing a highly viscous fluid into the formation to open and extend the fractures. As the highly viscous fluid is introduced into the fractures, slugs of a hardenable liquid are intermittently injected into the highly viscous fluid so that the slugs are carried into and held in spaced relationship in the fractures by the highly viscous fluid. Once the slugs of hardenable liquid have been placed in the fractures, the introduction of the highly viscous fluid is terminated so that the fractures are held in the open position while the hardenable fluid is permitted to set or harden thereby propping the fractures open. The highly viscous fluid is then recovered from the formation leaving flow channels therein through which desired fluids produced from the formation can readily flow.

A variety of high viscosity fluids can be employed in accordance with the present invention. However, the high viscosity fluid must be compatible with the hardenable liquid used, i.e., the high viscosity fluid cannot contain components which retard the setting of the hardenable liquid, and the high viscosity fluid must have a viscosity and other physical properties such that it is capable of holding slugs of the hardenable liquid in spaced relationship throughout the fractures to be propped for a period of time sufficient for the hardenable liquid to set. Examples of particularly suitable high viscosity fluids are water gels, water foams, hydrocarbon gels, hydrocarbon foams, and hydrocarbon-in-water or water-in-hydrocarbon emulsions. Suitable water gels can be formed by combining water with natural gums, carboxymethyl cellulose, carboxymethyl hydroxylethyl cellulose, polyacrylamide and starches. Chemical complexes of the gels formed through chemical cross linking can also be employed. Such complexes can be formed for example with complexing agents such as borate, copper, nickel and zirconium. In addition, other chemical complexes of the above materials can be used which are formed by organic complexers such as hexamethoxymethylmelamine.

Suitable hydrocarbon gels which can be employed in accordance with the present invention are those gels formed when a hydrocarbon liquid such as kerosene is combined with metallic soaps, polyisobutylene, polyalkyl stryene, polyisobutyl acrylate, polyisobutyl methacrylate and aluminum soaps.

High viscosity water and hydrocarbon foams can be employed which are formed by mixing water or a liquid hydrocarbon with a suitable surfactant and forming a high viscosity foam therefrom in a conventional manner utilizing an inert gas such as nitrogen.

High viscosity hydrocarbon-in-water or water-in-hydrocarbon emulsions are particularly suitable for carrying out the method of the present invention. Such emulsions can be formed by combining water gelled with a gelling agent such as hydroxyethyl cellulose with an emulsifier and a hydrocarbon liquid such as crude oil. As will be understood, many other highly viscous fluids can be employed in accordance with the present invention so long as such fluids are pumpable and exhibit viscosity properties suitable for holding the hardenable liquid in the fractures to be propped. In addition, the highly viscous fluid utilized must be capable of breaking, i.e., reverting to a relatively low viscosity fluid after a time period sufficient for the hardenable liquid to set so that the highly viscous fluid can be recovered from the formation. A variety of chemicals can be utilized which when added to the highly viscous fluid cause it to break after a period of time, or the highly viscous fluid used can be of a nature such that it breaks naturally after a period of time or is broken after a period of time by heat transferred to the fluid from the formation, contact with salt water in the formation, etc.

Any of a variety of hardenable liquids can be used in accordance with the method of the present invention so long as the liquid sets in a relatively short time, has sufficient compressive strength to prop the fractures after setting and is compatible with the highly viscous fluid used, i.e., does not cause the highly viscous fluid to break prematurely. Examples of such hardenable fluids are resins, plastics, epoxies and cement compositions. Of these, cement compositions are most preferred.

A particularly suitable cement composition is one formed of densified API Class A Portland Cement, 20 to 40 mesh (U.S. Sieve Series) sand present in the composition in an amount of about 20% by weight of dry densified cement, a set time accelerator such as sodium chloride present in the composition in an amount of about 12% by weight of dry cement, a friction reducer present in an amount of about 2% by weight of dry cement and water present in an amount sufficient to form the composition into a pumpable slurry.

A preferred technique for carrying out the method of the present invention in a formation penetrated by a well bore whereby fractures are created in the formation and propped open to create flow channels therein is to first introduce a highly viscous fluid into the formation by pumping the fluid through the well bore at a rate sufficient to create and extend one or more fractures in the formation. As the highly viscous fluid is introduced into the formation slugs of the hardenable liquid utilized are intermittently introduced into the highly viscous fluid so that the slugs of hardenable liquid are carried into the fractures and held therein in spaced relationship by the highly viscous fluid. After a number of the slugs of hardenable liquid have been placed in the fractures, the pumping and introducing of the highly viscous fluid is terminated, but pressure is maintained on the formation so that the created fractures are held open and the slugs of hardenable liquid are held in a stationary position within the fractures and are permitted to set therein. The set slugs of hardenable liquid form spaced pillars within the fractures extending between the faces thereof so that when pressure is removed from the formation, i.e., the formation is produced, the pillars resist the overburden pressures exerted by the formation on the fractures and maintain the fractures in an open position. After the hardenable liquid has set the highly viscous fluid is allowed or caused to revert to a relatively low viscosity fluid so that it can be recovered from the formation, i.e., produced back from the formation along with formation fluids. Since the hard pillars formed in the fractures extend along the lengths thereof in spaced relationship, flow channels through which formation fluids can readily flow to the well bore are provided which are not readily plugged by paraffin, magnetite, salt or other precipitant or solid material formed within the formation.

The intermittent introduction of the slugs of hardenable liquid into the highly viscous fluid as the highly viscous fluid is pumped down the well bore into the formation can be accomplished at the surface by alternately pumping quantities of the highly viscous fluid and slugs of the hardenable liquid into the well bore. If the well bore includes tubing extending to the fractured formation, the highly viscous fluid can be continuously pumped into the fractures by way of the annulus between the walls of the well bore and the tubing with the slugs of hardenable liquid being intermittently pumped through the tubing.

In order to present a clear understanding of the methods of the present invention, the following example is given:

EXAMPLE

A highly viscous gelled water-oil emulsion is prepared containing approximately 40% by volume gelled water and 60% by volume crude oil. The gelled water contains about 1% by volume potassium chloride and 0.3% by volume hydroxylethyl cellulose gelling agent. Small quantities of emulsifier, pH control additive and other conventional additives are added to the emulsion.

A cement slurry is prepared containing API Class A Portland Cement, a hematite ore densifier having a specific gravity of approximately 5.02 percent in the amount of about 54% by weight of dry cement, 20 to 40 mesh (U.S. Sieve Series) sand present in an amount of about 20% by weight of densified dry cement, a friction reducer comprised of polyvinylpyrrolindone in combination with the sodium salt of napthalene sulfonate present in an amount of about 2% by weight of densified dry cement, a set time accelerator, i.e., sodium chloride, present in an amount of about 12% by weight of densified dry cement and sufficient water to form a pumpable slurry.

A well completed in the Clinton sand formation is treated using the above-described treating fluids in accordance with the method of the present invention as shown in Table I.

TABLE I

| QUANTITY OF TREATMENT FLUID INTRODUCED INTO FORMATION | DESCRIPTION OF TREATMENT FLUID | FUNCTION OF TREATMENT FLUID | RATE OF INJECTION OF TREATMENT FLUID |
|---|---|---|---|
| 8000 GALLONS | FRESH WATER CONTAINING 1% BY WEIGHT KCl | PREFLUSH | 15 BBLS/MINUTE |
| 7000 GALLONS | OIL-IN-GELLED WATER EMULSION | FORM FRACTURES IN FORMATION | 15 BBLS/MINUTE |
| CEMENT SLURRY IN QUANTITY CONTAINING 14,100 POUNDS (150 SACKS) OF DRY CEMENT | CEMENT SLURRY | SLUG OF HARDENABLE LIQUID | 15 BBLS/MINUTE |
| 4000 GALLONS | OIL-IN-GELLED WATER EMULSION | SPACER FOR SLUG OF HARDENABLE LIQUID AND EXTEND FRACTURES | 15 BBLS/MINUTE |
| CEMENT SLURRY IN QUANTITY CONTAINING 14,100 POUNDS (150 SACKS) OF DRY CEMENT | CEMENT SLURRY | SLUG OF HARDENABLE LIQUID | 15 BBLS/MINUTE |
| 4000 GALLONS | OIL-IN-GELLED WATER EMULSION | SPACER FOR SLUG OF HARDENABLE LIQUID AND EXTEND FRACTURES | 15 BBLS/MINUTE |
| CEMENT SLURRY IN QUANTITY CONTAINING 14,100 POUNDS (150 SACKS) | | | |

TABLE I-continued

TREATMENT SCHEDULE

| QUANTITY OF TREATMENT FLUID INTRODUCED INTO FORMATION | DESCRIPTION OF TREATMENT FLUID | FUNCTION OF TREATMENT FLUID | RATE OF INJECTION OF TREATMENT FLUID |
|---|---|---|---|
| OF DRY CEMENT 4000 GALLONS | CEMENT SLURRY OIL-IN-GELLED WATER EMULSION | SLUG OF HARDENABLE LIQUID SPACER FOR SLUG OF HARDENABLE LIQUID AND EXTEND FRACTURES | 15 BBLS/MINUTE 15 BBLS/MINUTE |
| 1000 GALLONS | OIL-IN-GELLED WATER EMULSION | EXTEND FRACTURES | 15 BBLS/MINUTE |
| QUANTITY EQUAL TO CAPACITY OF WELL BORE | FRESH WATER | FLUSH WELL BORE | 15 BBLS/MINUTE |

After completing the treatment shown in Table I, the well is shut in for approximately 96 hours during which time the slugs of cement slurry set and the highly viscous fluid reverts to a relatively low viscosity fluid by contact with salt water in the formation, and then the well is swabbed to recover the treatment fluid. After recovering the treatment fluid, the well is placed on production with good results.

While presently preferred techniques for carrying out the method of the present invention have been described for purposes of this disclosure, it will be readily understood by those skilled in the art that numerous changes in such techniques can be made, and consequently, this invention is to be limited only by the lawful scope of the appended claims.

What is claimed is:

1. A method of fracture stimulating a subterranean formation penetrated by a well bore comprising the steps of:
   a. introducing a highly viscous fluid into said formation at a rate sufficient to create and extend one or more fractures therein;
   b. introducing at least one slug of a hardenable liquid into said formation;
   c. introducing additional highly visous fluid into said formation so that said slug of hardenable liquid is carried into and held in said fractures in said formation;
   d. terminating the introducing of said highly viscous fluid so that said fractures are held open while said slug of hardenable liquid is permitted to set thereby propping said fractures; and
   e. recovering said highly viscous fluid from said formation.

2. The method of claim 1 wherein said highly viscous fluid is selected from the group consisting of water gels, water foams, hydrocarbon gels, hydrocarbon foams and hydrocarbon-water emulsions.

3. The method of claim 2 wherein said hardenable liquid is a cement slurry.

4. A method of fracture stimulating a subterranean formation penetrated by a well bore comprising the steps of:
   a. injecting a highly viscous fluid into said formation at a rate sufficient to create and extend fractures therein;
   b. intermittently introducing slugs of a hardenable liquid into said highly viscous fluid so that said slugs of hardenable liquid are carried into said fractures and are held therein in spaced relationship by said highly viscous fluid;
   c. terminating the injection of said highly viscous fluid so that said fractures are maintained in the open position while said slugs of hardenable liquid are permitted to set into pillars extending between the faces of said fractures; and
   d. recovering said highly viscous fluid from said formation so that said fractures remain propped open by said pillars and fluids produced from said formation readily flow through said fractures to said well bore.

5. The method of claim 4 wherein said highly viscous fluid is selected from the group consisting of water gels, water foams, hydrocarbon gels, hydrocarbon foams and hydrocarbon-water emulsions.

6. The method of claim 5 wherein said hardenable liquid is a cement slurry.

7. A method of propping fractures in a subterranean formation penetrated by a well bore whereby fluids produced from said formation readily flow through said fractures to said well bore comprising the steps of:
   a. pumping a highly viscous fluid into said formation to open and extend said fractures;
   b. intermittently injecting slugs of a hardenable liquid into said highly viscous fluid so that said slugs are carried into and held in spaced relationship in said fractures by said highly viscous fluid;
   c. terminating the pumping of said highly viscous fluid so that said fractures are held open while said hardenable liquid is permitted to set thereby propping said fractures open; and
   d. recovering said highly viscous fluid from said formation.

8. The method of claim 7 wherein said highly viscous fluid is selected from the group consisting of water gels, water foams, hydrocarbon gels, hydrocarbon foams and hydrocarbon-water emulsions.

9. The method of claim 8 wherein said hardenable liquid is a cement slurry.

* * * * *